United States Patent Office 3,728,289
Patented Apr. 17, 1973

3,728,289
ELASTIC, TEAR-RESISTANT, HIGH-DENSITY FOAMS BASED ON POLYCARBODIIMIDE-POLYISOCYANATES
Franz Gottfried Reuter and Walter Fensch, Hannover, Germany, assignors to BASF Wyandotte Corporation, Wyandotte, Mich.
No Drawing. Continuation-in-part of application Ser. No. 677,740, Oct. 24, 1967. This application Oct. 26, 1970, Ser. No. 84,145
Claims priority, application Germany, Sept. 29, 1965, P 12 64 764.2
Int. Cl. C08g 22/46
U.S. Cl. 260—2.5 BF                                     7 Claims

ABSTRACT OF THE DISCLOSURE

Process for the manufacture of highly-elastic tear-resistant polyurethane foams of relatively high density by a one step process which comprises reacting (1) a mixture comprising a linear polyhydroxyl compound having a molecular weight of about 1,000 to about 3,000, a chain extender such as a bifunctional glycol, a catalyst, and water with (2) a polyisocyanate having a melting point below about 25° C. which is a diisocyanate modified by reaction with carbodiimide or a mixture of a diisocyanate and the reaction product of a diisocyanate and a carbodiimide.

BACKGROUND OF THE INVENTION

Field of the invention

This invention relates to a process for the manufacture of highly-elastic, tear-resistant polyurethane foams of relatively high density by a one-step system and particularly to polyurethane foams which are the reaction product of a polyol compound and certain diisocyanates. This application is a continuation-in-part of our application Ser. No. 677,740 filed Oct. 24, 1967, now abandoned.

Description of the prior art

In recent years, foamed resins and particularly polyurethane foams based on polyesters and polyols have dominated the plastics field and become increasingly useful in various applications because of their ability to be molded into a wide variety of useful products. With the advent of the foamed resins and their continued wide acceptance, the emphasis has now shifted to searching for economically feasible processes by which these materials may be produced which have the necessary physical characteristics to be suitable for a wide spectrum of areas.

One of the areas in which polyurethane foams have been employed to some extent is as a substitute for natural rubber products in the production of products which have heretofore only been successful using natural rubber. However, various problems have been encountered in the production of such rubber substitutes heretofore inasmuch as the prior foams have been deficient in such physical characteristics as tear-resistance, density, elasticity, abrasion resistance, tensile strength, etc. and thus have not been successful in replacing natural rubber to any great extent. Moreover the expense of production of polyurethane foams of this type by existing processes has been a deterrent to their use.

Of the processes known to the prior art for the production of such polyurethane foams, the most widely used has been the so-called two-step process in which a prepolymer is initially prepared which comprises the reaction product of a polyol or polyester reacted with a polyisocyanate and thereafter the prepolymer must be reacted in a second step with water or other foaming agents to effect cross-linking of the polymer. This two-step process of course has obvious disadvantages, particularly from the economic view.

While a number of processes have been devised by the prior art wherein a one-step process is utilized to produce polyurethane foams, no process of this type has been developed which will produce highly-elastic, tear-resistant polyurethane foams of relatively high density which are suitable as replacements for natural rubber. These foams have not been acceptable primarily because they are not resistant to cold weather because their freezing temperature lies only in the vicinity of about −15° C. Therefore, the foams have not been widely used in areas wherein they can be expected to be subjected to cold air temperatures. For example, the foams have not been found satisfactory for use in the open air as a dynamically loaded spring element or in related areas where the noted properties would be a limitation.

It is therefore clear that a distinct need remains in the art for an economically attractive one-step process for the production of polyurethane foams wherein the products produced thereby have desirable highly elastic and tear-resistant properties in combination with relatively high density and resistance to extreme physical temperatures.

SUMMARY OF THE INVENTION

It is accordingly one object of the present invention to provide a process for the preparation of highly-elastic, tear-resistant polyurethane foams of relatively high density by a one-step system which overcomes or otherwise mitigates the problems known in the prior art.

A further object of this invention is to provide a one-step process for the production of highly-elastic, tear-resistant polyurethane foams of relatively high density which are suitable as replacements for natural rubber in a wide variety of applications which comprises the reaction of a certain polyol mixture with a certain polyisocyanate and mixtures thereof.

Another object of this invention is to provide a novel one-step process for the production of highly-elastic, tear-resistant polyurethane foams of relatively high density which are substantially resistant to extreme temperature changes which involve the reaction of a polyhydroxyl compound having a molecular weight of about 1,000 to about 3,000 with a polyisocyanate or polyisocyanate mixture having a melting point below about 25° C.

A still further object of the present invention is to provide a novel, relatively high density polyurethane foam having high elasticity and excellent tear-resistance which are suitable as replacements for natural rubber as well as other areas.

Further objects and advantages of the present invention will become apparent as the description thereof proceeds.

In satisfaction of the foregoing objects and advantages there is provided by this invention a process for the manufacture of highly-elastic, tear-resistant polyurethane foams of relatively high density by a one-step system which comprises reacting (1) a mixture comprising a linear polyhydroxyl compound having a molecular weight of about 1,000 to about 3,000, a chain extender, a catalyst and water with (2) a polyisocyanate having a melting point below about 25° C. which is the reaction product of an organic polyisocyanate and a carbodiimide or a mixture of the polyisocyanate and the reaction product.

In addition to the above, there is provided by this invention a process for foaming the above described mixture by charging the mixture to a mold, maintaining the temperature of the mold between about 70° to about 120°

C. to effect foaming thereof, removing the foamed mixture from the mold and curing at room temperature.

DESCRIPTION OF THE PREFERRED EMBODIMENTS

The process of this invention is based on the discovery that polyurethane foams, as herein described, can be produced directly by a one-step system by reaction of a certain polyol mixture and certain organic polyisocyanates to produce polyurethane foams which are admirably suited as replacements for natural rubber. It has been found that this novel process permits the production of polyurethane foams having superior physical properties as compared with similar foams known to the prior art and that the process has great commercial advantages.

As indicated hereinabove, the novel process of this invention comprises reacting (1) a mixture comprising a linear polyhydroxyl compound having a molecular weight of about 1,000 to about 3,000, a chain extender, a catalyst and water with (2) polyisocyanate as described hereinafter. In conducting the process, reaction mixture (1) is initially produced by forming a mixture of the linear polyhydroxyl compound, the organic chain extender, a suitable catalyst and water as described hereinafter, which mixture has excellent storage properties and which then may be reacted with the diisocyanate as desired.

Linear polyhydroxyl compounds considered suitable for the process of this invention include those polyhydroxyl materials which have a molecular weight of between about 1,000 and about 3,000 and preferably 2,000, and include those which have a strictly linear structure. Broadly included within this class of reactants are the hydroxyl polyesters of polybasic acids such as those which have been reacted with an alkylene glycol. Representative polybasic acids for preparing these polyesters include adipic acid, sebacic acid, azelaic acid, dilinoleic acid, maleic acid and the like and suitable glycols for reaction therewith include ethylene glycol, propylene glycol, glycerine monomethyl ether, glycerine monoethyl ether, butylene glycols, pentane diol, diethylene glycol, dipropylene glycol and the like. Mixtures of each of these materials may also be used, such as ethylene glycol/butylene glycol mixtures. These hydroxyl polyesters are well known in the art.

Other linear polyhydroxyl components suitable for the preparation of these materials include poly(alkylene ether) glycols and such as the linear polymerizates of cyclic compounds such as tetrahydrofuran as well as the linear copolymers of epsilon-caprolactone, the latter comprising the reaction product of epsilon-caprolactone with glycols of the alkylene glycol type such as diethylene glycol, 1,4-butylene glycol and the like. Other polyhydroxyl compounds which have a linear structure and a molecular weight of between about 1,000 and about 3,000, not specifically mentioned, can of course be employed in the process of this invention. In regard to these reactants, it has been found that substantially all polycaprolactone esters having free terminated hydroxyl groups resulting from the reaction of epsilon-caprolactone and a glycol, can be utilized in the process of this invention.

These linear polyol components are generally solid compounds. However, for use in the process of this invention it is preferable and generally necessary for best results to reduce the melting point of these compounds by the addition thereto of a low molecular weight, strictly bifunctional glycol which, in addition to reducing the melting point of the polyol, also act as organic chain extension agent in the polymerization process. Reduction of the melting point provides the advantage that only a small amount of heat will be subsequently needed to liquify these compounds. Glycols of this type include of course the well known ethylene glycol, propylene glycol, diethylene glycol, tetramethylene glycol, hexanetriol, and the like as well as mixtures thereof.

For initiation of the foaming process, it is mandatory to employ suitable catalysts in the foaming system which catalysts should be selected so as not to be detrimental to aging of the resulting polyurethane foams. It is also necessary to employ catalysts which are water resistant in the process of this invention. It has been found that the reaction of the polyol mixture with a polyisocyanate or the mixture of polyisocyanates with the reaction product of polyisocyanates and carbodiimide may be suitably catalyzed by the addition thereto of a catalytic amount of a water-resistant tertiary amine catalyst or organometallic catalysts. Of the amine catalysts which are satisfactory there may be mentioned the diethylenediamines and triethylenediamines as well as trimethylamine, tetramethyl-1,3-butanediamine and the like. The organometallic catalysts which are satisfactory include those based on lead and tin and which are exemplified by carbon to tin or carbon to lead bonds. These catalysts include such materials as trimethyltin hydroxide, tributyltin hydroxide, trimethyl tin chloride, triphenyl tin hydride, triallyl tin chloride and the like. These tin and lead catalysts are well known in the prior art.

In order to obtain a foam product of sufficient elasticity according to this invention, it is essential to utilize water as the sole foaming agent in the process as this has proven to be the only material to result in products of sufficient elasticity.

It is also within the scope of the present invention to add to the polyol reaction mixture additional small amounts of various compounds which enhance the properties of the final product and aid in ease of reaction. For example, emulsifying agents or surface active agents may be employed to increase the stability of the reaction and the resultant foam. Particularly preferred materials of this type may be referred to as auxiliary agents such as silicone oil, castor oil and polysiloxanes. Also additional materials such as fillers, catalyst retarders such as citric acid, catalyst accelerators and the like may be added to the reaction mixture depending on the speed of reaction desired and the desired physical properties of the final product.

The above identified reactant materials for preparation of the polyol component are preferably employed in the following amounts based on parts by weight:

| Reactant | Amount, parts |
| --- | --- |
| Linear polyol | 85 to 99 |
| Glycol chain extenders | .5 to 5 |
| Emulsifier, catalyst retarders | .001 to 2 |
| Catalysts | .001 to 5 |
| Water | .5 to 5 |
| Fillers | .5 to 5 |

After the above-identified polyol mixture is prepared, it is reacted under foaming conditions with a mixture of a polyisocyanate and the reaction product of a polyisocyanate and carbodiimide or the reaction product of a polyisocyanate and carbodiimide.

The polyisocyanates which find utility in the process of the present invention include those which correspond to the following formula:

$$R(NCY)_x$$

wherein $x$ is 2 or more, R is preferably a divalent aromatic organic radical free of functional groups other than —(NCY) and Y is an oxygen or a sulfur atom. More particularly R may be arylene, or a substituted arylene such as phenyl, naphthyl, methylphenyl, dimethyl phenyl, methylnapthyl and the like. Particularly preferred aromatic diisocyanates in the above group for use in the process of the present invention include liquid phenylene-diisocyanates such as tolylene diisocyanates, xylene diisocyanates and the like. A particularly preferred isocyanate reactant is diphenylmethane-4,4′-diisocyanate.

Particularly advantageous and economical in the process of the present invention is the use of a mixture of one of the above diisocyanates with the reaction product of an aromatic diisocyanate with carbodiimide, the mixture being produced as described hereinafter. Also used to advantage in the present process as the isocyanate reactant is that consisting solely of the reaction product of an aromatic diisocyanate and carbodiimide. Where a mixture of these materials is employed, it is preferred to employ a mixture of about 15 percent to 25 percent of diisocyanate, and most preferably 20 percent, with about 75 percent to 85 percent and, most preferably 80 percent, of the diisocyanate/carbodiimide reaction product as advantageous results are achieved thereby.

With regard to the diisocyanate/carbodiimide reaction product, it is to be noted at this point that it is known in the prior art, particularly from German Pat. 1,005,726, that in polyester based foam systems, for example, polyester urethanes, in spite of their homogeneous or porous structure, that hydrolytic decompositions of the ester compounds in the molecules may be prevented either by mixing with the starting material a small amount of carbodiimide (.1 to .5 percent) or by subsequent exposure of the finished foamed product to a small amount of vapor. For this purpose however, the carbodiimides which are suitable include only those which have at least one additional tertiary amino group in the molecule or at least one reactive NCO group. Thus this prior German patent discloses the use of carbodiimides as aging resistors for plastics having ester bonds in the molecule, hence by this action becoming stabilizers of the foam. They are not disclosed in this patent as participating in the reaction process and therefore are not an ingredient of the material which they protect thereby being distinguished from their use in the instant process.

As is generally appreciated, carbodiimides' efficiency as stabilizers in this area lies in their ability to react very easily with carboxylic acids thus producing an acyclic urea. This enables them to capture or protect the carboxylic groups resulting from chain splitting during the polyester hydrolysis which would, in turn, accelerate auto-catalytically the further decomposition of the elastomers. Hence, use of carbodiimides in this manner prevents total disintegration of the molecule.

It is to be appreciated that the carbodiimides enter this function only as stabilizers if their —N=C=N— double bond remains intact during the manufacturing process. The process of German Pat. 1,005,726 meets this requirement while describing the carbodiimides as NCN double bonds which are additives to the reaction mixture or by affecting the finished plastics in vapor form. This German patent also mentions the possibility of utilizing carbodiimides as a stabilizers when chemically combined with the diisocyanate but only in the case when the combination is not through the group —N=C=N—, but rather in other reactive groups in the carbodiimide molecule. It may be concluded from this discussion of this prior German patent that the protective effect of the carbodiimide stabilizers are restricted to the polyester mass only.

On the contrary, the carbodiimides employed in the process of the present invention are not employed as stabilizers and in fact could not exercise this function because they are employed as a starting material in the manufacture of particular diisocyanates and act during the process as one of two necessary reaction components.

In the process of the present invention, the carbodiimide is reacted with the aromatic diisocyanate initially at a relatively high temperature of about 250° C. for a short period such as about 3 minutes. The —N=C=N— double bond which is characteristic of the carbodiimide compounds is believed to be disintegrated by this process wherein a 2 to 1 excess of diisocyanate is employed to react with the carbodiimide. The excess diisocyanate is believed to react with the carbodiimide to result in a new diisocyanate which consists of 1 mole of carbodiimide and 2 moles of diisocyanate. The reaction of these materials is believed to proceed by the following formula:

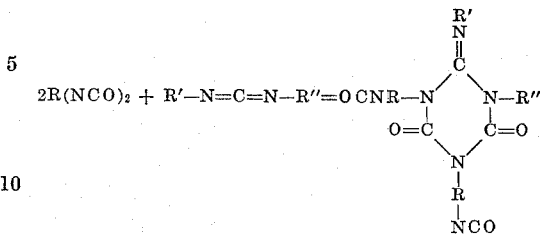

wherein R is an aromatic organic radical and R' and R" are organic radicals which may be unsubstituted or substituted with alkyl, cycloalkyl or aromatic radicals.

According to actual practice, and as gathered by the experience of the inventor, the behavior of the reactant product proves the above structure and clearly indicates that the structural formula of the newly formed diisocyanate is bonded in the total molecule of the —C—N group and is consequently deprived of the ability to protect polyesters against hydrolytic decomposition by destruction of the —N=C=N— double bond. As is further evident from this formula, the newly formed diisocyanate is a pure diisocyanate whose —NCO groups react in the usual way with all reactive hydrogens of a compound, quite in contrast to the carbodiimide stabilizers described in the above mentioned German patent and which are, according to this prior patent, only efficient to polyester and ester bonds.

As pointed out hereinabove, the carbodiimide diisocyanate mixture is prepared by mixing two moles of diisocyanate with one mole of carbodiimide, heating the mixture rapidly to 250° C. and keeping it at this temperature for a period of about 3 minutes. During the heating of the mixture, the reaction temperature should not exceed 270° C. Rather vigorous agitation is also required during the reaction. The carbodiimide is added to the diisocyanate in liquid or molten state. In this regard, it has been found that carbodiimide which has been kept molten for too long a period of time discolors and becomes unsuitable for the purpose of the process. After the above reaction is complete, the resulting product mixture is rapidly cooled for utilization in the indicated reaction with the polyol component in the foaming process.

The monocarbodiimides disclosed in Chemical Reviews, vol. 53 (1953), pages 145–166 may be used. For example, diisopropyl-carbodiimide, dicyclohexyl-carbodiimide, methyl-tert.butylcarbodiimide, tert.-butyl-phenyl-carbodiimide may be used. Preferably are used all aliphatic, cycloaliphatic, aromatic and mixed aliphatic-cycloaliphatic, aliphatic-aromatic and cycloaliphatic-aromatic monocarbodiimides, which contain substituents in 2- and 2'-position, as for example alkyl groups with 1 to 18 carbon atoms, such as methyl, ethyl, isopropyl, isobutyl, dodecyl, octadocyl, allyl, crotyl; aralkyl groups such as benzyl, B-phenylethyl; aryl groups such as phenyl, tolyl; alkoxy groups such as methoxy, ethoxy, butoxy; halogen radicals such as chlorine and bromine; nitro groups; carbalkoxy groups such as carbmethoxy or carbethoxy and cyan groups. Of course the monocarbodiimides can contain additionally to the substituents in 2,2'-position still further substituents of the above described type on the aromatic and/or cycloaromatic radicals. There are to be mentioned in particular those carbodiimides which are tetrasubustitued in 2,2'- and 6,6'-position on the aromatic or cycloaliphatic radical, and thereby preferably those which contain alkyl and/or alkoxy groups. Examples of such compounds are 2,2'-dimethyl-diphenylcarbodiimide,
2,2'-diisopropyl-diphenylcarbodiimide,
2,2'-diethoxy-diphenylcarbodiimide,
2,2'-dichloro-diphenylcarbodiimide,
2,2'-ditolyl-diphenylcarbodiimide,
2,2'-dibenzyl-diphenylcarbodiimide, 2,2'-dinitrodiphenylcarbodiimide,
2-ethyl-2'-isopropyl-diphenylcarbodiimide,
2,6,2',6'-tetraethyl-diphenylcarbodiimide,
2,6,2',6'-tetraisopropylphenylcarbodiimide,
2,6,2',6'-tetra-sec.-butyldiphenylcarbodiimide,
2,6,2',6'-tetraethyl-3,3'-dichlorodiphenylcarbodiimide,
2,6,2'-6'-tetraisopropyl-3,3'-dinitro-diphenylcarbodiimide,
2-ethylcyclohexyl-2-isopropylphenyl-carbodiimide,
2,4,6;2',4',6'-hexaisopropyl-diphenylcarbodiimide,
2,2'-diethyl-dicyclohexylcarbodiimide,
2,6,2',6'-tetraisopropyl-dicyclohexylcarbodiimide,
2,6,2',6'-tetraethyl-dicyclohexylcarbodiimide,
2,2'-dichlorodicyclohexylcarbodiimide and the like. The most preferred carbodiimide is 2,6,2',6'-tetraisopropyl-diphenylcarbodiimide.

According to this invention, it has been found that this new polyisocyanate/carbodiimide reaction component has the following characteristics and advantages:

(1) It is liquid at room temperatures and below (10° C. to 12° C.) so as to be usable in the liquid state;

(2) It is capable of absorbing additional quantities of diisocyanate (up to 90 percent) from which it results, while reacting with carbodiimide, without losing its liquid consistency;

(3) It is neither extremely reactive nor inert, its rate of reaction lying in the average range;

(4) Its rate of reaction can be easily inhibited or accelerated;

(5) It is capable of being stored for several months: manufactured in a one-step process with a small amount of technical investment, and reacts to produce high quality finished products; and (6) Its mixing ratio with other reaction components is technically favorable.

In view of the above, it is to be appreciated that use of the polyisocyanate/carbodiimide reaction product and mixtures thereof with polyisocyanates as discussed above, represents an especially preferred embodiment of the invention for the obvious advantages gained thereby.

The reaction products of diisocyanates and carbodiimides used in this invention are not to be confused with the carbodiimide-polyisocyanate products disclosed in U.S. 3,152,162. The disclosed adducts are prepared by heating a diisocyanate until carbon dioxide is evolved and two moles of diisocyanate combine to form one mole carbondiimide.

The polyisocyanate, polyisocyanate/carbodiimide reaction product or mixtures thereof are employed in the process of the present invention in an amount of about 1 part polyisocyanate reactant to about 2 to 5 parts polyol reactant, based on the total weight of the reaction mixture. Hence in the process, there will always be present in polyol excess of about 2 to 1 or 5 to 1.

The process of the present invention is preferably carried out in practice as follows:

An appropriate quantity of linear diol having a molecular weight between about 1,000 and 3,000, maintained in the liquid or molten state, is transferred into an open or closed reaction system and the required amount of chain extender, such as low molecular weight glycol, is added with agitation. Thereafter, auxiliary agents such as silicone oil or castor oil and the described fillers are added, followed by the catalyst mixture which is usually employed as an aqueous system of about a 20 percent to about 70 percent aqueous mixture. During the reaction, agitation of the ingredients should be intense with special care being taken not to agitate too slowly. The materials are maintained as a mixture for about 20 minutes duration. During the addition of the aqueous catalyst mix and thereafter, care should be exercised not to exceed a temperature of about 50 to 55° C. to avoid reaction water losses. For the same reason, the mixing kettle of the polyol reaction component mix should be closed until ready for use. After preparation of this polyol reactant mixture, it may be stored for periods as long as three months without loss of its activity.

After preparation of the above identified reaction mixture, the diisocyanate reactant, which is employed in liquid form, and as pointed out above, melts at a temperature below about 25° C., is added to the polyol reactant mixture at a temperature of between about 20° and 70° C. After the above mixture has been achieved, the mix may be transferred into suitable heated molds, which are preferably maintained at a temperature of about 70° to 120° C., and the mixture allowed to foam at these temperatures to achieve the desired physical performance characteristics of the product. The foamed product is then removed from the mold after cooling.

In regard to the physical properties of the foam, the following table is presented which sets out the physical performance characteristics of the products obtained by the process of this invention when reacting the polyol mixture with the isocyanate/carbodiimide reaction product and particularly the type of products produced by the processes exemplified by Examples I, II and III.

TABLE I

| Characteristic | Dimension | 1 | 2 | 3 | 4 |
|---|---|---|---|---|---|
| Density | G./cm.$^3$ | 0.2 | 0.35 | 0.45 | 0.5 |
| Tensile strength | Kp./cm.$^2$ | 23.0 | 34.0 | 46.0 | 50.0 |
| Breaking strength | Percent | 460.0 | 400.0 | 400.0 | 400.0 |
| Elastic strength | Kp./cm.$^2$ | 6.0 | 10.0 | 13.0 | 14.5 |
| Shock elasticity | Percent | 36.0 | 39.0 | 39.0 | 39.0 |
| Deformation by pressure at room temperature. | do | 8.0 | 12.0 | 12.0 | 13.2 |

Pressure Loss on Hydrolysis
Sample Size: 50 x 50 x 30 mm.

| Spring deflection | Stress load (kp.) Runs | | | |
|---|---|---|---|---|
| | 1 | 2 | 3 | 4 |
| Before hydrolysis: | | | | |
| 5 mm | | | 43 | 63 |
| 10 mm | | | 84 | 116 |
| 12 mm | | | 109 | 153 |
| After hydrolysis (8 days at 80° C.): | | | | |
| 5 mm | | | 42 | 62 |
| 10 mm | | | 81 | 114 |
| 12 mm | | | 106 | 149 |

The following Table II also illustrates physical performance characteristics of products produced according to this invention and particularly exemplifies the type of products produced according to the processes exemplified by Examples IV and V, set forth hereinafter.

TABLE II

| Characteristic | Dimension | Runs | | | | | |
|---|---|---|---|---|---|---|---|
| | | 1 | 2 | 3 | 4 | 5 | 6 |
| Density | G./cm. | .32 | .35 | .40 | .42 | .45 | .61 |
| Tensile strength | Kp./cm. | 28.0 | 44.0 | 39.0 | 37.0 | 45.0 | 79.0 |
| Breaking strength | Percent | 440.0 | 480.0 | 470.0 | 440.0 | 450.0 | 530.0 |
| Elastic strength | Kp./cm. | 8.2 | 11.6 | 12.7 | 10.2 | 11.6 | 22.7 |
| Shock elasticity | Percent | 43.0 | 45.0 | 47.0 | 46.0 | 45.0 | 48.0 |
| Deformation by pressure at room temperature. | do | 7.3 | 7.5 | 8.7 | 8.6 | 10.0 | 12.6 |

Pressure Loss on Hydrolysis
Sample Size: 50 x 50 x 30 mm.

| Spring deflection | Stress load (kp.) Runs | | | | | |
|---|---|---|---|---|---|---|
| | 1 | 2 | 3 | 4 | 5 | 6 |
| Before hydrolysis: | | | | | | |
| 5 mm | 40 | 46 | 59 | 69 | 68 | 143 |
| 10 mm | 56 | 64 | 89 | 101 | 101 | 209 |
| 12 mm | 68 | 73 | 112 | 117 | 129 | 273 |
| After hydrolysis (8 days at 80° C.): | | | | | | |
| 5 mm | 36 | 39 | 57 | 61 | 57 | 119 |
| 10 mm | 51 | 60 | 77 | 91 | 93 | 202 |
| 15 mm | 59 | 71 | 95 | 111 | 114 | 269 |

The process of the present invention has been found to have the following advantages over processes known to the prior art.

(1) Only 1 step is necessary to carry out the reaction requiring only two components which are easily mixed and readily available, i.e. the polyol and isocyanate components. The polyol component is a mix capable of long storage and includes all necessary ingredients, except the polyisocyanate, which participate in the reaction. Thus one reaction step of the known process is eliminated.

(2) The mixing ratio of the two reaction components, polyol and isocyanate, is about 2 to 1 to about 5 to 1 respectively, and thus is very favorable, allowing mixing of the two components by simple technical means in spite of the low viscosity and low melting points thereof. The melting zone of the polyol component system is below +50° C. and the melting point of isocyanate components is below 25° C. Hence any parts of the foaming or molding apparatus which come in contact with the reaction components, such as the container pumps or tubes leading to the mixing head, require very little heat to be kept free of reaction product of all times. As reagrds the mixing ratio, the mixing ratio of known processes is about 100 to 3 to 100 to 4.

(3) The process of the invention permits storage of both components of the reaction for periods of up to 3 months whereas the prepolymers of known processes are stable only for a few hours.

(4) The reaction can be controlled, contrary to existing processes, due to the possibility of combining various catalysts and accelerating and retarding the reaction with ease.

The products prepared according to the present invention has been found particularly useful to replace natural rubber because of their advantage of having relatively low density and being inexpensive to prepare. Another advantage of the products of this invention over natural rubber products is their compressibility of approximately the same load application. Also the products of this invention are characterized by excellent abrasion resistance and essentially better light and ozone stability as well as an excellent resistance to oil.

The following examples serve to further illustrate the practice of the invention but are not to be considered as limitative thereon.

In the following examples, the parts of each component employed are given as parts by weight based on the total weight of the formulation.

EXAMPLE I 1000 parts of a linear hydroxyl polyester having a molecular weight of 2000 and a hydroxyl number of 55, 110 parts of a low molecular polyol crosslinker, consisting predominantly of tetramethylene glycol, 6 parts of silicone oil and 7 to 8 parts of a 46% aqueous solution of triethylene diamine were intimately mixed.

The diol component resulting from this procedure was heated to 45° C. and thereafter reacted with 553 parts diisocyanate, consisting of a mixture of 80% diphenylmethane - 4,4' - diisocyanate and 20% of the reaction product of diphenylmethane - 4,4' - diisocyanate and 2,6,2',6'-tetraisopropyl-diphenylcarbodiimide.

The resultant foaming mix was transferred while still liquid into a mold which had been preheated to 75° to 85° C. and left in the mold for a period of 5 to 15 minutes at 80° C. Thereafter, the product was released from the mold and cured further for a period of 12 hours at 80° C. The finished product obtains its optimum properties as described in the preceding table, either after a prolonged post cure or simply by storing it for six weeks at room temperature.

EXAMPLE II 1000 parts of a molten polytetramethylene ether glycol having a hydroxyl number of 55 and a molecular weight of 2000 were mixed at the melting temperature with 80 parts of tetramethylene glycol and 10 parts of a 52.62 percent aqueous solution of triethylene diamine and reacted thereafter with 650 parts of a mixture of 80% of the reaction product of diphenylmethane - 4,4-diisocyanate and 2,6,2',6' - tetraisopropyl-diphenylcarbodiimide and 20% diphenylmethane 4,4'-diisocyanate. The product was molded according to Example I.

EXAMPLE III

This example was carried out as in Examples I and II except that instead of the hydroxyl polyester of Example I and the polytetramethylene ether glycol of Example II, respectively, a hydroxyl polycaprolactone prepared by reacting E-caprolactone with diethylene glycol and having a molecular weight of 2000 and a hydroxyl number of 56 was utilized. An excellent foam was produced.

The prceeding examples illustrate the process of the invention. The variations thereon which are obvious to those skilled in the art can be made in accordance with the teaching of the instant specification without departing from the spirit and scope of the invention. Accordingly, the invention is to be considered as limited only by the scope of the claims.

What is claimed is:

1. A highly elastic, tear-resistant, high density polyurethane foam product prepared by the process which comprises reacting substantially simultaneously a polyhydroxyl compound having a molecular weight of from about 1000 to about 3000, a chain extending agent and water as the sole blowing agent with an organic polyisocyanate having a melting point below about 25° C. and comprising the reaction product of a carbodiimide and an organic polyisocaynate.

2. The product of claim 1 wherein the said organic polyisocyanate comprises the reaction product of an aromatic diisocyanate and a carbodiimide mixed with the said aromatic diisocyanate.

3. The product of claim 2 wherein the aromatic diisocyanate is diphenylmethane-4,4'-diisocyanate.

4. The product of claim 1 wherein the polyhydroxyl compound is a polycaprolactone, a poly(alkylene ether) glycol or a polyester prepared by esterification of a dicarboxylic acid and a glycol.

5. The product of claim 1 wherein the polyisocyanate is a mixture of from about 75% to about 85% of the reaction product of an organic polyisocyanate and a carbodiimide and from about 15% to about 25% of the organic diisocyanate.

6. A highly elastic, tear-resistant, high density polyurethane foam product prepared by the process which comprises reacting substantially simultaneously a polyhydroxyl compound having a molecular weight of from about 1000 to about 3000, a chain extending agent and water as the sole blowing agent with an organic polyisocyanate having a melting point below about 25° C. and comprising the reaction product of diphenylmethane-4,4'-diisocyanate and 2,6,2',6' - tetraisopropylidiphenylcarbodiimide.

7. The product of claim 6 wherein the organic polyisocyanate is a mixture of from about 75% to about 85% of the reaction of product of diphenylmethane - 4,4'-diisocyanate and 2,6,2',6'-tetraisopropyldiphenylcarbodiimide and from about 15% to about 25% of diphenylmethane-4,4'-diisocyanate.

References Cited
UNITED STATES PATENTS 3,072,582   1/1963   Frost _____ 260—2.5
3,152,162   10/1964  Fischer et al. _____ 260—453

DONALD E. CZAJA, Primary Examiner

H. S. COCKERAM, Assistant Examiner

U.S. Cl. X.R.

260—2.5 AB, 2.5 AG 2.5 AT